May 1, 1934. J. C. McCUNE 1,956,691
QUICK ACTION VALVE DEVICE
Filed Oct. 31, 1930
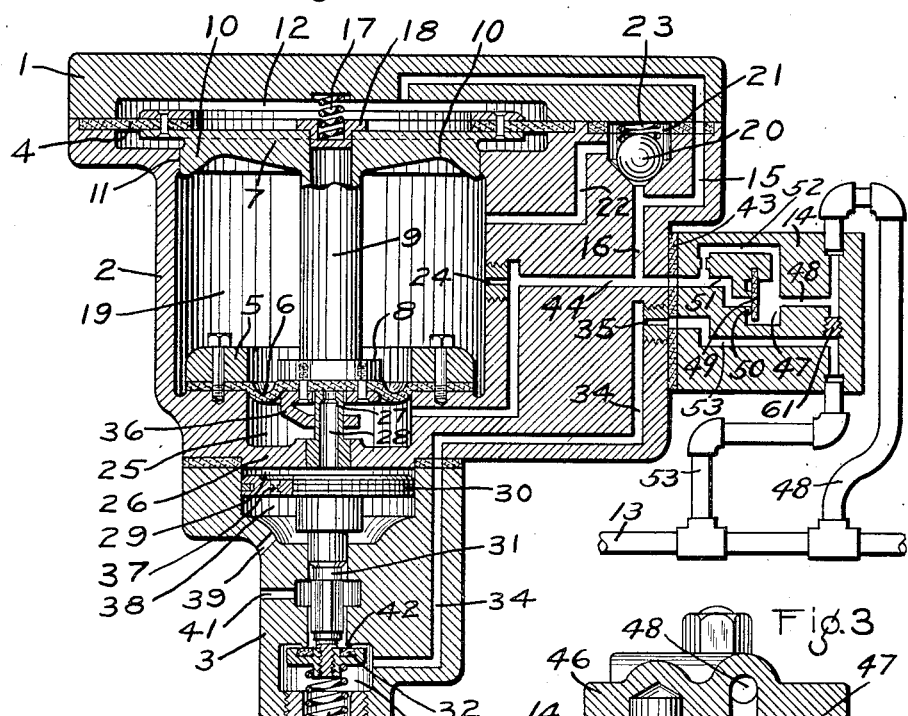
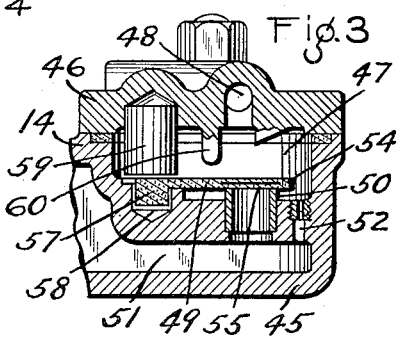
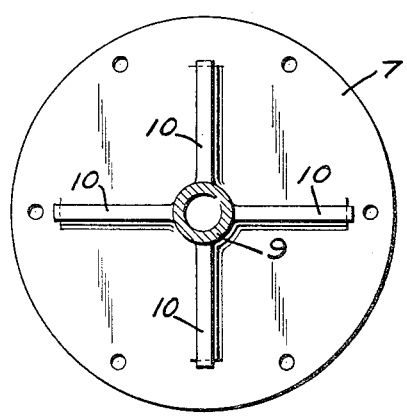
INVENTOR.
JOSEPH C. McCUNE
BY Wm. M. Cady
ATTORNEY.

Patented May 1, 1934

1,956,691

UNITED STATES PATENT OFFICE 1,956,691

QUICK ACTION VALVE DEVICE

Joseph C. McCune, Edgewood, Pa., assignor to The Westinghouse Air Brake Company, Wilmerding, Pa., a corporation of Pennsylvania Application October 31, 1930, Serial No. 492,458

15 Claims. (Cl. 303—82)

This invention relates to fluid pressure brakes and more particularly to means for effecting quick serial action through the brake pipe of an automatic fluid pressure brake system.

It has been found that the quick action means at present employed, does not act with desired rapidity on long trains, so that in effecting an emergency application of the brakes, the brakes are liable to be applied on cars at the head end of the train sufficiently in advance of the application of the brakes on cars at the rear end of the train, with the result that dangerous shocks are produced by the running in of the slack.

The principal object of my invention is to provide an improved quick action means by which the time of the quick action transmission is reduced to a minimum.

In order to effect a quicker serial action, I propose to employ a very sensitive quick action means which is quickly responsive to a light differential of pressures to effect a local reduction in brake pipe pressure and which will not operate under gradual or service rates of brake pipe reductions and other fluctuations in brake pipe pressure not at an emergency rate of reduction. In carrying out my invention, I employ few moving parts which are light in weight and which have short operating ranges, all of which tends to increase the sensitivity of the quick action means.

It is necessary that there be a heavy volume flow of fluid at a high velocity in the brake pipe, which is only produced when the brake pipe is reduced at an emergency rate, in order to create a sufficient differential in fluid pressures in my improved device to cause it to operate to effect a local reduction in brake pipe pressure.

It will thus be seen that my improved device, being very sensitive to light differential pressures, will produce a transmission of quick action in less time than heretofore, while at the same time the device will only operate when an emergency rate of reduction in brake pipe pressure is initiated.

Other objects and advantages will appear in the following more detailed description of the invention.

In the accompanying drawing; Fig. 1 is a diagrammatic sectional view of a quick action device embodying my invention; Fig. 2 is a bottom plan view of a portion of a follower member, the stem thereof being broken away; Fig. 3 is an actual sectional view through a portion of a valve device constructed in accordance with my invention; and Fig. 4 is a plan view of the valve employed in said device.

As shown in the drawing, the quick action valve device may comprise a casing formed of sections 1, 2 and 3. Clamped between the sections 1 and 2 is a flexible diaphragm 4. Spaced away from the diaphragm 4 and clamped between the casing section 2 and an annular member 5 is a flexible diaphragm 6, the exposed area of which diaphragm is considerably less than that of the diaphragm 3.

Interposed between the diaphragms 4 and 6 is a follower member having a follower head 7 which is secured to the flexible diaphragm, a follower head 8 which is secured to the diaphragm 6 and a hollow stem 9 which rigidly connects the heads 7 and 8.

One side of the follower head is provided with radially arranged strengthening ribs 10, the outer ends of which engage an interior surface 11 of the casing section 2 and serve to guide the head as it is moved back and forth relative to the casing.

At one side of the flexible diaphragm 4 and follower head 8 is a chamber 12 which is open to an exterior surface 43 of the casing section 2 through connected passages 15, 16 and 44. Contained in the chamber 12 is a spring 17 which is interposed between and engages the casing section 1 and a cup-shaped member 18 carried by the follower head 7.

Between the diaphragms 4 and 6 and in the casing section 2 there is a chamber 19 to which the passage 44 is connected through passage 15, past a ball check valve 20, through a valve chamber 21 and passage 22, the ball check valve being subject to the pressure of a coil spring 23 contained in the chamber 21. The passage 44 is also connected to the chamber 19 through a choke plug 24.

At one side of the flexible diaphragm 6 there is a chamber 25 which is open to the passage 44. Secured to a wall 26 of the casing section 2 and contained in the chamber 25 is a valve seat member 27 having a passage 28 therethrough, which is open at one end to a chamber 29 containing a piston 30 having a stem 31 to which is secured a vent valve 32 contained in a valve chamber 33 open to the exterior surface 43 of the casing by way of a passage 34 and a choke plug 35.

The flexible diaphragm 6 is adapted to seat on the upper end of the valve seat member 27 to close communication through the passage 28 from the diaphragm chamber 25 to the piston chamber 29. When the diaphragm 6 is flexed upwardly, communication between these chambers is open. Secured to the diaphragm 6 and follower head 8 is a guide member 36 which slidably engages the valve seat member 27 to guide the lower end of the follower member.

The piston 30 is provided with a port 37 of small diameter which connects the chamber 29 at one side of the piston with a chamber 38 at the other side of the piston, the chamber 38 being open to the atmosphere through a passage 39.

The vent valve 32 is subject to the pressure of a spring 40 contained in the valve chamber 33 and is adapted to control communication from the valve chamber 33 to the atmosphere through a passage 41.

For the purpose of preventing the quick action valve device from operating to discharge fluid under pressure from the brake pipe 13 under certain charging conditions which will hereinafter be more fully described, a valve device 14 may be employed having a casing which may comprise a body section 45 which is clamped against the exterior surface 43 of the casing section 2 of the quick action valve device, and may also comprise a cap 46 which is secured to the body section 45.

Formed in the casing of the valve device 14 is a chamber 47 to which the brake pipe 13 is constantly connected through a branch pipe and passage 48, the passage 48 being formed in the cap 46. Contained in the chamber 47 is a check valve 49 which is adapted to seat on a seat ring 50 mounted in the body section 45 to close communication through a passage 51 from the valve chamber 47 to the passage 44 in the quick action valve device with which the passage 51 registers. The brake pipe 13 however, is connected to the passage 44 through the valve chamber 47 and a restricted passage 52 in the body section 45, which passage by-passes the valve 49 and is open to the passage 51.

The brake pipe 13 is also connected to the vent valve chamber 32 of the quick action valve device through another branch pipe and passage 53 in the casing of the valve device 14 and the passage 34.

The valve 49 is preferably made from a rubber composition and comprises a flat flap or valve portion 54 which is adapted to seat on the seat ring 50, there being a rigid disc 55 embedded in the rubber composition. This disc may be made from aluminum or any other suitable material and is of sufficient size to prevent distortion of the valve when the valve is seated on the seat ring.

At one end of the valve portion 54 there is a narrow flexible portion 56, which at one side is provided with a projection 57 which is loosely received in a recess 58 formed in the body section 45.

The cap 46 is provided with a projection 59, the outer end of which, when the cap is secured to the body section 45 is in close proximity to, but not in actual contact with the upper surface of the valve. It will here be noted that since the valve is not engaged by the projection, and the projection 57 on the valve 49 is loosely mounted in the casing, a very slight pressure differential in the passage 51 will cause the valve to move away from the seat ring 50 without any resistance being offered by the valve itself due to its inherent flexibility.

When the pressure differential in the passage 51 is great enough, the valve 49 will engage the end of the projection 59, and the valve portion 54 will be flexed upwardly over the edge of the projection 59, thus establishing free communication from the passage 51 to the valve chamber 47. The upward flexing of the valve is limited by the valve engaging an inwardly extending stop lug 60 carried by the cap, said lug having open ends to permit the free flow of fluid from the chamber 47 to the passage 48 leading to the brake pipe 13.

In operation, when the brake pipe 13 is charged with fluid under pressure, fluid flows therefrom to the diaphragm chamber 12 through pipe and passage 48, valve chamber 47, restricted passage 52, and passages 44, 16 and 15, fluid under pressure supplied to the chamber 47 maintaining the valve 49 seated on the seat ring 50. Fluid also flows from the passage 15 to the diaphragm chamber 19 past the ball check valve 20 and through passage 22. From the passage 44 fluid also flows to the chamber 19 by way of the choke plug 24. Fluid also flows through the passage 44 to the chamber 25. Fluid under pressure from the brake pipe 13 also flows to the vent valve chamber 33 by way of pipe and passage 53, the choke plug 35 and passage 34.

The flow of fluid through the restricted passage 52 to the passage 44 will be at a faster rate than fluid is permitted to flow from the passage 44 to the chamber 19 through the choke plug 24 and the flow of fluid to the diaphragm chamber 12, by way of passages 44, 16 and 15 is at an unrestricted rate as compared to the restricted flow of fluid to the chamber 19 through the choke plug 24. Fluid under pressure in the passage 16 will be prevented from flowing to the chamber 19 through the passage 22 until such time as the pressure of fluid acting on one side of the ball check valve 20 is sufficient to overcome the opposing pressure of the spring 23.

It will thus be seen that the pressure of fluid in the chamber 12 will build up a sufficient time ahead of the build up in pressure in chamber 19, that the pressure of fluid in this chamber 12, together with the pressure of the spring 17, will maintain the flexible diaphragm 6 seated on the valve seat member 27 against the opposing pressures of fluid in the chambers 19 and 25. Now when the pressures of fluid in the chambers 12, 19 and 25 are substantially equal, the pressure of the spring 17 maintains the diaphragm 6 seated against the valve seat member 27.

With the diaphragm 6 closing communication from the chamber 25 to the piston chamber 29, the pressure of the spring 40 maintains the vent valve 32 seated on a seat rib 42, thus maintaining communication from the brake pipe to the atmosphere closed.

When a reduction in brake pipe pressure at an emergency rate is initiated, the pressure of fluid in the chamber 12 is reduced by flow through passages 15, 16, 44 and 51, past the valve 49 and through passage and pipe 48. The pressure of fluid in the diaphragm chamber 25 is also reduced by flow through the passage 44. Further, the pressure of fluid in the chamber 19 is reduced by flow through the choke plug 24 and passage 44, the ball check valve 20, preventing the back flow of fluid from this chamber to the passage 44.

Since the reduction in the pressure of fluid in the chamber 12 is at a faster rate than that of the reduction in pressure in the chamber 19 as effected through the choke plug 24, fluid at the higher pressure in chamber 19 acting on the under side of the flexible diaphragm 4 and follower head 7 causes the diaphragm and follower member to move upwardly against the pressure of the spring 17 and the downward pressure of fluid in chamber 19 acting on the upper side of the diaphragm 6. The follower member, as it is thus moved, carries the flexible diaphragm 6 with it and out of seating engagement with the seat member 27, so that fluid under pressure now flows from the diaphragm chamber 25 to the piston chamber 29 by way of the passage 28 in the valve seat member 27.

Fluid under pressure thus supplied to the piston chamber 29 causes the piston to move downwardly, unseating the vent valve 32 from its seat rib 42 against the opposing pressure of the spring 40, so that fluid under pressure is now vented to the atmosphere from the chamber 33 and consequently from the brake pipe by way of passage 41.

Due to the relative areas of the diaphragms 4 and 6, the light weight of the several moving parts, and the short travel of these parts, the difference in pressures in the chambers 12 and 19 need only be light to operate the device to effect the desired local reduction in brake pipe pressure.

A local reduction in brake pipe pressure is thus produced in less time than heretofore, and succeeding quick action devices are operated in a similar manner, so that quick action is propagated throughout the train in a minimum time.

It will here be noted that in initially charging the equipment or in effecting a recharge after an emergency application of the brakes, the chamber 19 is charged by way of passages 44, 16 and 22, so that the pressure of fluid in this chamber will, to some extent, counteract the pressure of fluid in the chamber 12 acting downwardly on the flexible diaphragm 4 and follower head 7, thus preventing the diaphragm 6 from being forced into such close engagement with the seat member 27 as to cut or otherwise damage the diaphragm.

The port 37 in the piston 30 is for the purpose of permitting fluid under pressure to flow therethrough from the piston chamber 29 to the chamber 38, from which chamber, fluid thus vented flows to the atmosphere through passage 39 when the diaphragm 6 is seated on the seat member 27, so that upon recharging the equipment the pressure of the spring 40 will cause the vent valve 42 to seat on its seat rib and close communication from the brake pipe to the atmosphere. This port is also for the purpose of maintaining the piston chamber 29 constantly connected to the atmosphere to prevent the build up of pressure in the piston chamber in the event of leakage past the diaphragm 6 and its seat, thus effectively preventing the unintentional operation of the piston to effect a reduction in brake pipe pressure.

The passage through the choke plug 24 is of such a diameter that it will permit the flow of fluid from the chamber 19 at a maximum rate substantially corresponding to the flow of fluid under pressure from the brake pipe at a service rate, so that in effecting reductions in brake pipe pressure at a service rate or less, my improved quick action device will not operate to effect a local reduction in brake pipe pressure.

As hereinbefore described and shown in the drawing, the passage through the choke plug 35 restricts the flow of fluid from the brake pipe to the atmosphere. In adapting my inproved quick action device for use with some fluid pressure brake equipments, this is desirable, but it will be understood that in adapting the device for use with other equipments, where it is not desired to restrict the flow of fluid from the brake pipe to the atmosphere, this choke plug may be omitted.

The purpose of the spring 17 is to assist in maintaining the diaphragm 6 seated on the seat member 27 while charging the device and to prevent the diaphragm from being unintentionally moved from its seat upon slight variations in brake pipe pressure.

It will be noted that when fluid under presssure is supplied from the brake pipe 13 to the valve chamber 47 of the valve device 14, the valve 49 will be closed and the charging of the chambers 12 and 19 of the quick action valve device will be governed by the flow of fluid through the restricted passage 52, and that when the brake pipe pressure is reduced, the valve 49 will open and permit unrestricted flow of fluid from the diaphragm chamber to the brake pipe.

To release the brakes on the train and to recharge the train brake pipe, the usual brake valve device is first moved to release position in which the main reservoir is connected to the brake pipe and after a predetermined interval of time has elapsed is then moved from release to running position in which communication from the main reservoir is closed off and communication from the feed valve to the brake pipe is established. On long trains, when the main reservoir is connected to the brake pipe, the brake pipe pressure at the head end of the train will be greater than that at the rear end of the train, and when the brake valve device is moved from release to running position, the higher pressure at the head end of the train will reduce by the flow of fluid toward the rear end. The brake valve device, feed valve device and main reservoir have not been shown in the drawing for the reason that they may be of the usual type and function in the usual well known manner.

While the brake valve device is in release position, the restriction in the passage 52 so retards the flow of fluid to the passage 44 and thereby to the diaphragm chamber 12, that the pressure of fluid in this chamber will not be as high as brake pipe pressure when the brake valve device is moved from release to running position. Now when the brake valve device is moved to running position, the pressure of fluid at the head end of the train will reduce toward the rear end of the train, and since the pressure in diaphragm chamber 12 has not been built up equal to the high brake pipe pressure at the head end of the train, no reduction in the pressure of fluid in the chamber 12 will result, consequently, the quick action valve device will not be caused to operate to vent fluid under pressure from the brake pipe.

If the valve device 14 were omitted and the passages 44 and 34 of the quick action valve device were directly connected to the brake pipe 13, it might be, in some cases, that when the brake valve device is moved from release to running position, the brake pipe reduction at the head end of the train, due to the flow of fluid toward the rear end of the train, would be such that the consequent reduction in the pressure of fluid in the diaphragm chamber 12 would be sufficient to permit the diaphragm 4 and follower 10 to be moved upwardly by the pressure of fluid in the chamber 19 and thus unintentionally effect the venting of fluid under pressure from the brake pipe.

It will be noted that by the use of the valve device 14, the possibility of the quick action valve device operating unintentionally as above mentioned is eliminated.

In the drawing, I have shown a plug 61 closing communication between the brake pipe passages 48 and 53, thus maintaining the flow of fluid from the diaphragm chambers 12 and 19 to the brake pipe separated from the flow of fluid from the brake pipe to the atmosphere, so that the flow of fluid from the brake pipe will not interfere with or effect in any way the flow of fluid from the diaphragm chambers to the brake pipe. By this arrangement, the proper operation of the quick action valve device is insured. It may however, be found that, when the passages 48 and 53 are connected, the quick action valve device will operate as intended, and when such is the case, the plug 61 may be omitted. When the plug 61 is omitted, the branch pipe 53 is also omitted and the end of the passage 53 which is open to the pipe 53 is plugged.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a quick action valve device subject to opposing fluid pressures varying with variations in fluid pressure in the brake pipe, means for controlling the variations in one of said opposing fluid pressures to create a differential between the opposing fluid pressures when a reduction in brake pipe pressure is effected at a predetermined rate for causing said device to operate to vent fluid from the brake pipe, and means for controlling the variation in said opposing fluid pressure when brake pipe pressure is increased for causing said device to operate to close off the flow of fluid from the brake pipe.

2. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, means for restricting the flow of fluid from said brake pipe to said chambers, a passage by-passing said means through which fluid under pressure is adapted to be vented from one of said chambers to the brake pipe at a relatively fast rate, a restricted passage through which fluid under pressure is adapted to be vented from the other of said chambers to the by-pass passage, and means for preventing the flow of fluid from the brake pipe to the by-pass passage.

3. In a fluid pressure brake, the combination with a brake pipe, a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, means for restricting the rate at which said chambers are charged, a passage by-passing the restricting means through which fluid under pressure is adapted to be vented from one of said chambers to the brake pipe at a relatively fast rate, a restricted passage through which fluid under pressure is adapted to be vented from the other of said chambers to the by-pass passage, and a check valve preventing the flow of fluid from the brake pipe to said by-pass passage.

4. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, a restricted passage through which said chambers are charged with fluid under pressure from said brake pipe, a passage by-passing said restricted passage through which fluid under pressure is adapted to be vented from one of said chambers to the brake pipe at a relatively fast rate, a restricted passage through which fluid under pressure is adapted to be vented from the other of said chambers to the by-pass passage, and a valve preventing the flow of fluid from the brake pipe to said chambers.

5. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, means for restricting the flow of fluid from said brake pipe to said chambers, means operative to retard the flow of fluid under pressure to one of said chambers, a passage by-passing said means through which fluid under pressure is adapted to be vented from one of said chambers to the brake pipe at a relatively fast rate, a restricted passage through which fluid under pressure is adapted to be vented from the other of said chambers to the by-pass passage, and means for preventing the flow of fluid from the brake pipe to the by-pass passage.

6. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, means for restricting the flow of fluid from said brake pipe to said chambers, means for delaying the flow of fluid under pressure to one of said chambers to insure an advance build up in pressure in the other of said chambers, a passage by-passing said means through which fluid under pressure is adapted to be vented from one of said chambers to the brake pipe at a relatively fast rate, a restricted passage through which fluid under pressure is adapted to be vented from the other of said chambers to the by-pass passage, and means for preventing the flow of fluid from the brake pipe to the by-pass passage.

7. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, means for restricting the rate of flow of fluid from the brake pipe to said chambers for retarding the build up of pressure in said chambers equal to that of the brake pipe in releasing the brakes, a passage by-passing said means through which fluid under pressure is adapted to be vented from one of said chambers to the brake pipe at a relatively fast rate, a restricted passage through which fluid under pressure is adapted to be vented from the other of said chambers to the by-pass passage, and means for preventing the flow of fluid from the brake pipe to the by-pass passage.

8. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, a valve device having a restricted passage through which fluid under pressure is supplied to said chambers, an unrestricted passage through which fluid under pressure is released from said chambers, and a valve operable to close communication through said unrestricted passage from the brake pipe to said chambers when fluid under pressure is supplied from the brake pipe.

9. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, a valve device having a restricted passage through which fluid under pressure is supplied to said chambers, an unrestricted passage through which fluid under pressure is released from said chambers, and a loosely mounted flap valve operable to close communication through said unrestricted passage from the brake pipe to said chambers when fluid under pressure is supplied from the brake pipe.

10. In a fluid pressure brake, the combination with a brake pipe, of a quick action valve device having a valve operable to vent fluid under pressure from the brake pipe, a piston for actuating said valve, valve means operable to control the supply of fluid under pressure to said piston, a movable abutment subject to the opposing pressures of fluid in chambers at opposite sides of said abutment for controlling the operation of said valve means, both of said chambers being in constant communication with the brake pipe and being charged with fluid under pressure from said brake pipe, means for restricting the rate of flow of fluid from said brake pipe to said chambers, a passage by-passing said means through which fluid under pressure is adapted to be vented from one of said chambers to the brake pipe at a relatively fast rate, a restricted passage through which fluid under pressure is adapted to be vented from the other of said chambers to the by-pass passage, and means for preventing the flow of fluid from the brake pipe to the by-pass passage.

11. In a fluid pressure brake, the combination with a brake pipe, of a quick action valve device comprising a movable abutment subject to the opposing pressures of fluid in chambers at opposite sides of said abutment for controlling the venting of fluid under pressure from the brake pipe, both of said chambers being charged with fluid under pressure from the brake pipe, and a valve device comprising a casing having a restricted passage through which fluid under pressure supplied from the brake pipe to said chambers flows, and having an unrestricted passage through which fluid under pressure released from said chambers flows to said brake pipe and further having a flexible valve loosely mounted in said casing operable to close communication through said unrestricted passage from the brake pipe to said chambers when fluid under pressure is supplied from said brake pipe.

12. In a fluid pressure brake, the combination with a brake pipe, of a quick action valve mechanism comprising a normally seated valve adapted when unseated to vent fluid under pressure from the brake pipe, a piston operable by fluid under pressure to unseat said valve, valve means operable upon a sudden reduction in brake pipe pressure for supplying fluid under pressure from the brake pipe to said piston to cause said piston to operate to unseat said valve, said valve means comprising a pair of movable abutments having differential areas subject to brake pipe pressure at one side and having differential areas subject at the other side to fluid under pressure supplied from the brake pipe, and a valve operated by said abutments upon a reduction in brake pipe pressure for supplying fluid from the brake pipe to effect the operation of said piston.

13. In a fluid pressure brake, the combination with a brake pipe, of a quick action valve mechanism comprising a normally seated valve adapted when unseated to vent fluid under pressure from the brake pipe, a piston operable by fluid under pressure to unseat said valve, a pair of movable abutments having differential areas subject at one side to brake pipe pressure and at the other side to fluid under pressure supplied from the brake pipe, and a valve operated by said abutments upon a reduction in brake pipe pressure for supplying fluid under pressure to effect the operation of said piston to unseat the first mentioned valve.

14. In a fluid pressure brake, the combination with a brake pipe, of a quick action valve mechanism comprising a normally seated valve adapted when unseated to vent fluid under pressure from the brake pipe, a piston operable by fluid under pressure to unseat said valve, a pair of movable abutments having differential areas subject at one side to brake pipe pressure and at the other side to fluid under pressure supplied from the brake pipe, and a valve operated by said abutments upon a reduction in brake pipe pressure for supplying fluid under pressure from the brake pipe to effect the operation of said piston to unseat the first mentioned valve.

15. In a fluid pressure brake, the combination with a brake pipe, of a quick action valve mechanism comprising a normally seated valve adapted when unseated to vent fluid under pressure from the brake pipe, a piston operable by fluid under pressure to unseat said valve, a pair of movable abutments having differential areas subject at one side to brake pipe pressure and at the other side to fluid under pressure supplied from the brake pipe, a valve operated by said abutments upon a reduction in brake pipe pressure for supplying fluid under pressure to effect the operation of said piston to unseat the first mentioned valve, means for seating the first mentioned valve upon the substantially complete venting of fluid under pressure from the brake pipe, and means for actuating said abutments to seat the second mentioned valve upon the substantially complete venting of fluid under pressure from both sides of said abutments.

JOSEPH C. McCUNE.